United States Patent [19]

Davis

[11] Patent Number: 4,692,029

[45] Date of Patent: Sep. 8, 1987

[54] COMESTIBLE BEATER

[76] Inventor: William L. Davis, 880 E. 1st S., Salt Lake City, Utah 84102

[21] Appl. No.: 718,560

[22] Filed: Apr. 1, 1985

[51] Int. Cl.⁴ .......................... A23G 9/00; B01F 7/00
[52] U.S. Cl. .................................... 366/149; 62/343; 366/279; 366/329; 366/343
[58] Field of Search .............. 366/144, 145, 147, 149, 366/184, 192–194, 279, 292, 293, 295, 342, 325, 326, 329, 343; 62/342, 343; 99/452, 453, 455

[56] References Cited

U.S. PATENT DOCUMENTS

| | | | |
|---|---|---|---|
| 2,304,579 | 12/1942 | Lindsey | 366/325 X |
| 2,622,411 | 12/1952 | Ogden | 366/312 X |
| 2,671,646 | 3/1954 | Lindsey | 366/326 X |
| 3,161,404 | 12/1964 | Jay | 366/325 X |
| 3,385,568 | 5/1968 | Gray | 366/325 X |
| 3,914,956 | 10/1975 | Knight | 366/149 X |
| 4,357,112 | 11/1982 | Davis | 366/192 X |

Primary Examiner—Timothy F. Simone
Attorney, Agent, or Firm—Thorpe, North & Western

[57] ABSTRACT

A device for preparing a beaten product and including a beater assembly driven rotatively about a generally vertical axis, with an improved beater assembly comprising an elongate rotor body having at least one blade unit formed integrally with the rotor body. Each of the blade units comprising an elongate base member formed integrally with the rotor body and a plurality of spaced blades formed integrally with the base member.

6 Claims, 8 Drawing Figures

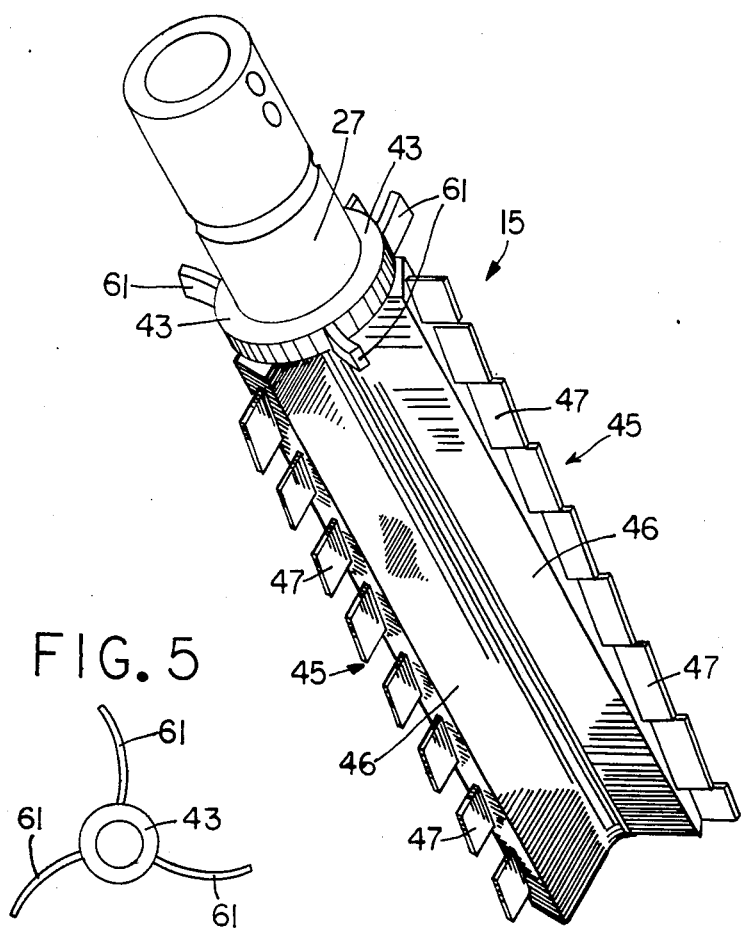
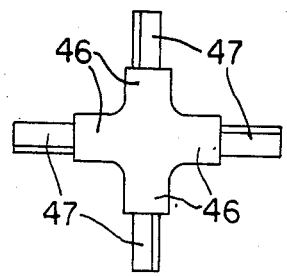
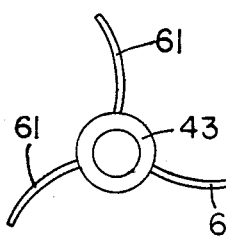
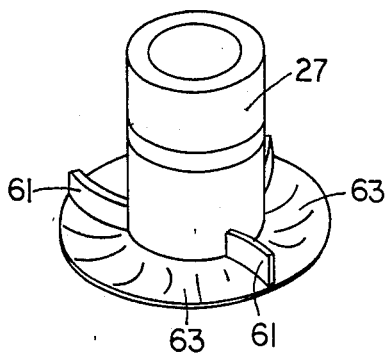
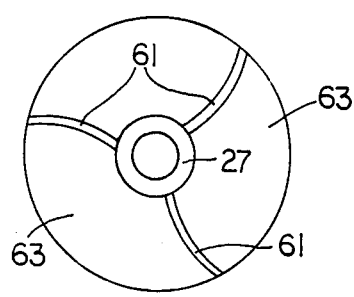

COMESTIBLE BEATER

BACKGROUND OF THE INVENTION

1. Field

The present invention pertains to improved machines and in particular improved beater units for such machines which are used for preparing beaten, frozen products made from fruit juices or other liquid substances which may or may not contain suspended solids and in which the substances are subjected to a rapidly turning rotary beater at temperatures below the freezing point of the liquid substances.

2. State of the Art

Machines for making frozen confections in which a rotary agitation unit or beater is positioned vertically within an elongate, vertical, freezing chamber are shown in U.S. Pat. Nos. 2,622,411; 2,671,646; 2,649,974; 3,385,568; and 4,357,112. These machines all utilize various types of beater units including blades projecting into close proximity to the wall of the freezing chamber. While the rotary beater is turning, the ingredients of the frozen confectionary product which is to be prepared are introduced into the upper end of the elongate freezing chamber, and as the ingredients progress downwardly they are agitated violently by the blades of the rotary beater to an extent to form a frozen food product similar to ice cream by the time the beaten substance is discharged downwardly from the lower end of the freezing chamber into a cup or other receptacle.

The above patents disclose various means for attaching the blades of the rotary beater to the rotor. Because of the high speed operation of the rotary beater, the blades have to be sturdy, and the attachment of the blades must also be capable of withstanding the forces encountered during the high speed operation. Various means are disclosed for removably attaching the blades to the rotor, but in all the disclosed variations problems arise with the effort needed in cleaning and maintaining the beater units sanitary. Because of the various attachment means as used in the rotary beaters of the prior art, the beater units contain undesirable crevices and areas which are difficult to clean. The beater units require total disassembly which was of course is time and labor intensive.

OBJECTIVES

A principal objective of the present invention is to provide an improved unitary beater unit which incorporates integral blades which are permanently affixed to the rotor, with the elimination of cracks, crevices and other areas which are difficult to clean. A further objective is to provide an improved unitary beater unit in accordance with the preceding sentence wherein a sturdy, strong construction is provided which provides sufficient agitation and turbulence to the ingredients within the freezing chamber.

SUMMARY OF THE INVENTION

The above objectives are achieved in accordance with the present invention by providing an improved rotary beater in which the beater is specially constructed in an integral, unitary fashion so as to facilitate rapid and complete cleaning and maintenance of the overall device in sanitary conditions. The improved rotary beater can be quickly and effectively cleaned in place within the freezing chamber as often as necessary to maintain sanitary conditions at all times. In addition, the beater, of course, can be removed from the freezing chamber for cleaning. There is required no disassembly of the beater unit however, as there is when cleaning the various beater assemblies of the prior art. In addition, the unitary construction of the present invention provides exceptional strength, and the beater unit has been found to operate effectively and with a maximum overall freezing efficiency for the machine in which it is operating.

The improved beater assembly is used in conventional apparatus for preparing a beater product. Such conventional apparatus includes a cylindrical chamber into which the ingredients of the product to be produced are introduced. The improved beater is rotatively mounted within the chamber, and a motor is provided for importing rotational movement to the beater.

In accordance with the present invention, the improved beater assembly comprises an elongate rotor body which is disposed in the chamber for rotation about a generally vertical axis. At least one blade unit is formed integrally with the rotor body. The blade unit comprises an elongate base member which is formed integrally with the rotor body so that the base member extends outwardly from the longitudinal surface of the rotor body. A plurality of vertically spaced blades are formed integrally with the base member and project outwardly from the base member toward the cylindrical side wall of the chamber. The blades are oriented such that the plane of each blade is inclined at an acute angle from the vertical when the rotor body is disposed in the chamber, whereby the blades beat the product and advance the product downwardly as the rotor body rotates within the chamber.

Additional objects and features of the invention will become apparent from the following detailed description, taken together with the accompanying drawings.

THE DRAWINGS

Preferred embodiments of the present invention representing the best made presently contemplated of carrying out the invention are illustrated in the accompanying drawings in which:

FIG. 2 is a pictorial view of one preferred embodiment of a beater unit in accordance with the present invention;

FIG. 3 is a bottom plan view of the beater of FIG. 2;

FIG. 4 is a fragmentary side view of the beater of FIG. 2;

FIG. 5 is a plan view of a flinger unit which is advantageously incorporated on the beater unit of FIG. 2;

FIG. 6 is a pictorial of a second embodiment of a flinger unit in which the flinger unit includes a dished tray;

FIG. 7 is a plan view of the flinger unit of FIG. 6; and

DETAILED DESCRIPTION OF THE ILLUSTRATED EMBODIMENTS

Figure 1:
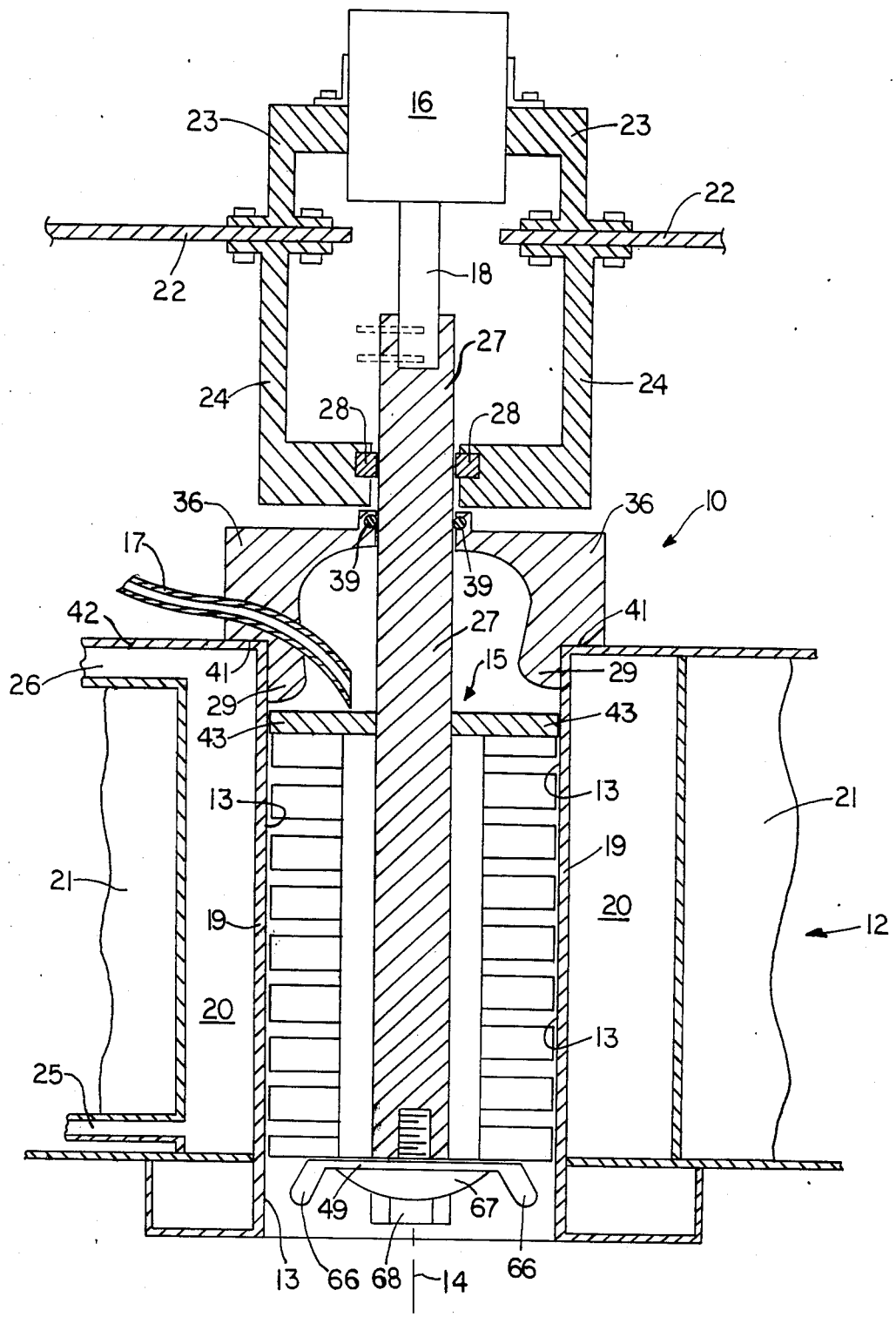
FIG. 1 is a fragmentary vertical section through the freezing chamber and beater assembly of apparatus in accordance with the present invention.

In FIG. 1, there is illustrated generally at 10 a freezer compartment constructed in accordance with the present invention. The freezer compartment 10 is typically part of a freezer unit which can be self standing or adapted to rest on a table or other support structure. The freezer compartment 10 includes a structure 12 containing and defining a vertically extending cylindrical chamber 13 centered about a vertical axis 14. A beater assembly 15 is driven rotatively about the axis 14 by a motor 16.

A liquid which may or may not contain suspended solids and which is to be frozen, is introduced into the upper end of the chamber 13 through an inlet tube 17 leading from a source (not shown) of the liquid. This liquid may be an appropriate fruit juice, a freezable mix, or any other desired ingredient or mixture of ingredients which is to be frozen and beaten as it passes downwardly through chamber 13. The source of liquid may typically be a container holding the product ingredients in liquid form, with the container being pressurized or elevated with respect to the chamber 13 so that the liquid can be fed from the container to the chamber 13 through the inlet tube 17.

The side wall of chamber 13 may be formed by a vertical straight cylindrical tube 19 centered about axis 14 and formed of a material such as stainless steel capable of withstanding corrosion and rusting in use. Tube 19 and the chamber 13 within its interior are cooled by passage of a refrigerant through an annular compartment 20 which is disposed about the wall 19 of chamber 13. A conventional refrigerating unit, although not shown in the drawings, would include a compressor and a condenser and would deliver a pressurized refrigerant, such as Freon, in liquid form through an inlet line 25 into the lower end of compartment 20. The refrigerant would conventionally evaporate within the compartment 20 and vaporous refrigerant would be discharged from the upper portion of the compartment 20 through a line 26. Heat insulating material 21 is positioned about and insulates the refrigerant compartment 20.

The beater assembly 15, as shown in FIG. 1, is driven by a direct drive linkage to the motor 16. The beater assembly 15 includes a vertical shaft 27 which is centered rotates about the vertical axis of the chamber 13 when the beater assembly 15 is positioned within the chamber 13. The upper end of the shaft 27 is connected directly to the drive shaft 18 of the motor 16 by any of numerous conventional means well known in the art. The motor 16 is mounted to a support 22 which is advantageously, although not shown specifically in the drawings, formed as part of the support structure 12 of the freezer apparatus. The motor 16 can be mounted to the support 22 by appropriate brackets 23. A second set of brackets 24 advantageously extend downwardly from the support, and bearing means 28 are provided on the second set of brackets 24. The bearing means 28 journals the shaft 27 of the beater assembly 15 for rotation about the axis 14. The motor 16 is preferably an induction type motor turning at a speed of 1500 to 2000 or more revolutions per minute.

The upper end of the freezing chamber 13 may be closed by an upper, removable cover 36, which is formed in two halves meeting in a diametrically vertical plane containing axis 14. The two halves of the cover 36 form together a dome-shaped interior surface which defines the top cover of the chamber 13. Semi-circular openings through the central portion of the mated halves of cover 36 forms a journal-like opening through which tha shaft 27 of the beater passes. A rubber O-ring 39 can be positioned around the shaft 27 immediately above the cover 36, or a groove can be provided in the opening in the cover 36 to accept the O-ring. The two halves of the cover 36 have downwardly projecting complementary portions 29 forming together a cylindrical flange fitting within and locating the cover 36 within the upper portion of the chamber 13. An annular shoulder 41 formed by the two complementary halves of the cover 36 is engageable downwardly against a top horizontal wall 42 of the refrigerant compartment 20 to further support the cover 36 in its correct position.

The interior shape of the cover 36 is generally that of a dome. The interior wall in particular is curvilinear and has no cracks, crevices or sharp ridges which can collect dirt or other material. The curvilinear shape is readily cleaned. The cover 36 can be quickly removed without other disassembly of the apparatus, and the chamber 13 and beater assembly 15 can quickly and readily be cleaned by spraying a cleaning solution into the chamber 13 from the open top. After cleaning, the cover 36 is replaced, and the equipment is once again ready to be used.

The cover 36 has a second opening therein which is adapted to receive the inlet tube 17 for introduction of the liquid ingredients to the freezing chamber 13. The tubing 17 is preferably arranged such that the terminal end is located closely adjacent to the shaft 27 of the beater 15 and just above a flinger element 43 which will be described more fully hereinafter.

One embodiment of the improved beater assembly 15 of the present invention is shown in FIGS. 1–4. The beater assembly includes a rotor body in the form of the vertical shaft 27 which extends essentially the full length of the beater. As mentioned previously, the rotor body or shaft 27 is adapted to be disposed within the chamber 13 and to rotate about a generally vertical axis which coincides with the axis 14 of the chamber 13. At least one blade unit 45 is formed integrally with the rotor body. Preferably, three or four equally spaced blade units 45 are used, but one or two could be utilized. The embodiments of the beater assemblies illustrated and described herein have four such blade units 45.

Each blade unit 45 has an elongate base member 46 which is formed integrally with the rotor body or shaft 27 so that the base member 46 extends outwardly from the longitudinal surface of the shaft 27. When more than one blade unit 45 is employed, the respective base members 46 are equally spaced circumferentially around the shaft 27. In the illustrated embodiments, the longitudinal central axes of the four base members 46 are spaced by 90 degrees around the shaft 27. Throughout this specification and the accompanying claims, the term "integrally" is meant to mean that the two parts being referred to are affixed together as a single unit. This can mean that the two parts are formed from the same stock, i.e., cast as a single unit or machined from a unitary piece of stock. In addition the two parts can be permanently affixed together such as by welding brazing or silver soldering. The critical criteria being that the beater assembly 15, with the exception of the flinger 43 which will be described hereinafter, is of a unitary construction and cannot be further taken apart into component parts. This provides for a strong beater assembly which is simple in design, can be readily and quickly removed from the freezer apparatus and which is readily and efficently cleaned both within the chamber 13 as well as when it has been removed from the chamber 13.

A plurality of vertically spaced blades 47 are formed integrally with the base member 46 and project outwardly from the base member 46 toward the cylindrical side wall of the chamber 13. The blades 47 are oriented such that the outer edges thereof lie in planes which are inclined at an acute angle from the vertical when the beater 15 is disposed within the chamber 13. In other words, the planes of the blades 47 at their outer edges make an acute angle with the longitudinal axis of the beater 15, whereby the blades 47 beat the frozen product forming on the inner walls of the chamber 13 and advance the frozen product downwardly as the beater 15 rotates within the chamber 13.

In the embodiment of the beater assembly 15 as illustrated in FIGS. 1-4, the elongate base member 46 is raised from the surface of the rotor or shaft 27, and the outwardly facing surface of the base member 46 has a width which is at least as large as the offset or circumferential displacement of the top and bottom edges of each of the blades 47. The blades 47 project or extend outwardly from the outwardly facing surface of the base member 46 with mutually respective top edges of the blades 47 being adjacent to one longitudinal side of the outwardly facing surface of the base member 46 and with mutually respective bottom edges of the blades 47 being adjacent to the other longitudinal side of the outwardly facing surface of the base member 46.

In constructing the beater assembly as shown in FIGS. 1-4, the base member 46 and the blades 47 of each individual blade unit are machined from an elongate bar. The outwardly facing surface of the base member 46 and the blades 47 are formed by selectively machining the elongate bar, such that the blades 47 are an integral part of the base member 46. The base member 46 is then permanently and integrally attached to the rotor or shaft 27 such as by welding, brazing, or silver soldering. The junctures between the base members 46 and the rotor or shaft 27 are machined or ground so as to be smooth and arcuately shaped as shown in FIGS. 2 and 3. The smooth, arcuate junctures between the base members 46 and the rotor or shaft 26 and in the quick and easy cleaning of the beater assembly.

Figure 8:
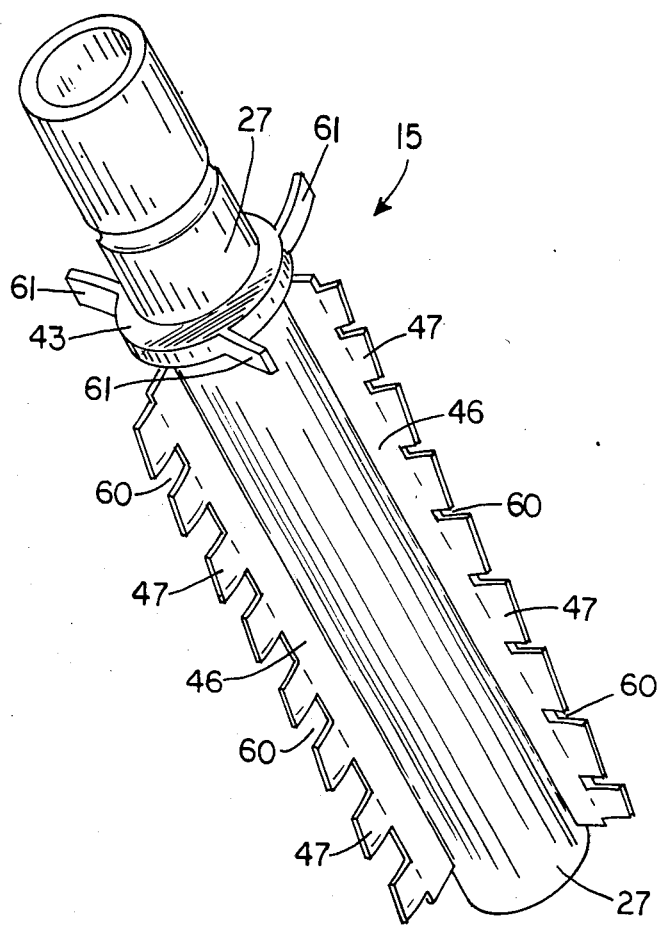
FIG. 8 is a pictorial view of a second preferred embodiment of a beater unit in accordance with the present invention.

In the embodiment of the beater assembly 15 as illustrated in FIG. 8, the base member 46 and blades 47 of each blade unit are formed from an elongate strip or band which has spaced slits 60 cut into the strip or band from one of the longitudinal sides of the strip or band. The slits 60 extend only partially through the strip of band such that the longitudinal side of the strip or band opposite that from which the slits 60 extend forms the base member 46 and the slit portions of the strip or band form the blades 47. The longitudinal side of the strip or band forming the base 46 is permanently and integrally attached as by welding, brazing or silver soldering to the surface of the rotor or shaft 27. The blade portions 47 between the slits 60 are twisted with respect to the longitudinal axis of the band so that each blade 47 is inclined with the outer edges thereof lying in planes which are inclined at an acute angle from the vertical when the beater assembly 15 is disposed within the chamber 13. In other words, the planes of the blades 47 at their outer edges make an acute angle with the longitudinal axis of the beater assembly 15, whereby the blades 47 beat the frozen product forming on the inner walls of the chamber 13 and advance the frozen product downwardly as the beater assembly 15 rotates within the chamber 13 of the freezing unit.

In both of the illustrated embodiments of the beater assembly 15, the blades 47 of each of the blade units correspond generally to the blades 47 of the other blade units, but the blades 47 of mutually adjacent blade units are staggered vertically from each other. As best shown in FIG. 4, the blades 47 of adjacent blade units are offset or staggered vertically. As illustrated, the space between the rightmost blades 47 is spaced upwardly from the space between the central blades 47, and the latter are spaced upwardly from the space between the leftmost blades 47. The offset nature of the blades 47 effects efficient beating and aggitation of the freezing product, and the slant of the blades 47, as explained before, advance the freezing product downwardly in the freezing chamber 13.

In the preferred embodiments of the invention a distributor means is provided adjacent to the uppermost blades 47 of the beater assembly 15 when the beater is positioned within the freezing chamber 13. The distributor means is adapted to receive the liquid ingredients which are introduced into the chamber 13 and to immediately impel the liquid ingredients outwardly against the cylindrical side wall of the freezing chamber 13 adjacent to the uppermost blades 47 of the beater assembly 15. As illustrated in FIGS. 1, 2, 3 and 5, a flinger element 43 is positioned adjacent the upper ends of the blade units and directly between the discharge end of the inlet tube 17 and the uppermost blades 47 on the beater assembly 15. The flinger unit 43 is adapted to rapidly distribute the liquid products from the inlet tube 17 to the upper walls of the chamber 13. As illustrated in FIGS. 1 and 2, the flinger element comprises a plurality of blade elements 61 which are arcuately shaped and project outwardly from a collar 62 encircling the shaft 27 immediately adjacent to the uppermost blades 47. The arcuately-shaped projections or blade elements 61 are adapted to impel the liquid ingredients outwardly against the side wall of the chamber 13.

The distributor means can be modified as shown in FIGS. 6 and 7 to further comprise a dish shaped flange 63 extending from the rotor or shaft 27. The arcuately-shaped projections or blade elements 61 are attached to the upper, dished surface of the flange 63. The dished surface of the flange 13, imports a slight upward movement to the liquid ingredients as the liquid ingredients are impelled radially outwardly from the rotor or shaft 27 by the arcuately-shaped projections or blade elements 61.

A lower discharge element or blade 49 can be attached to the lowermost end of the rotor or shaft 27 as shown in FIG. 1. The blade 49 may be stamped of sheet metal. The discharge blade 49 has two arcuately extending arms 66. The arms 66 are adapted to aid in discharging the frozen product from the chamber 13 as well as adding an attractively shaped contour to the frozen product as it is discharged. The discharge element or blade 49 is retained on the lower end of the rotor or shaft 27 by a retaining element 67 and a bolt 68 which is adapted to be screwed into a threaded opening in the end of the rotor or shaft 27.

All of the parts of the freezer apparatus which contact the food product should be formed of a material which will not corrode or be otherwise affected by contact with the liquid ingredients or the frozen product. The freezing chamber 13 and the beater assembly 15 including the flinger unit 43 and the bottom parts 49, 67 and 68 are best made of stainless steel. The upper removable cover 36 and the inlet tube can be made of appropriate plastic material.

Although preferred embodiments of the invention have been illustrated and described, it is to be understood that the present disclosure is made by way of example and that various other embodiments are possible without departing from the subject matter coming within the scope of the following claims, which subject matter is regarded as the invention.

I claim:

1. In apparatus for preparing a beaten product including a chamber into which the ingredients of said product are introduced, said chamber having a generally vertical axis and a cylindrical side wall, said apparatus further including a beater assembly rotatively mounted within said chamber and a motor for imparting rotational movement to said beater assembly, an improved beater assembly comprising an elongate rotor body disposed in said chamber to rotate about the generally vertical axis of said chamber, said rotor body having a longitudinal surface formed by at least three, elongate, rectangular, flat faces which are equally spaced around the circumference of said rotor body and which face radially outwardly from said vertical axis of said chamber, a plurality of blades with at least one blade projecting outwardly from each of the respective flat faces of said rotor body toward the cylindrical side wall of said chamber, with each of said blades being formed integrally with said rotor body and inclined at an acute angle from the vertical when the rotor body is disposed in said chamber, whereby said blades beat the product and advance the product downwardly as said rotor body rotates with said chamber, and distributor means are provided adjacent to the uppermost blades of said beater assembly when the beater assembly is positioned within said chamber, said distributor means comprising a dish-shaped flange extending from the rotor body, and a plurality of arcuately-shaped projections attached to the upper dished surface of said flange.

2. An assembly as in claim 1 wherein the chamber includes an inlet passage for introducing the ingredients into the chamber adjacent to the uppermost blade of said blade unit.

3. Apparatus as in claim 1 wherein the rotor body includes a vertically extending shaft which is adapted to extend from the upper end of the chamber, and means are provided for driving the vertically extending shaft from said motor.

4. Apparatus as in claim 3, wherein the motor is mounted above the chamber, and the vertically extending shaft is firmly connected directly to the drive of said motor.

5. Apparatus as in claim 1, wherein from two to four blade units are provided, with the blade units being equally spaced circularly about said rotor body.

6. Apparatus as in claim 1, wherein said blades are essentially flat and the inclination of each blade is such that the top edge of each blade is adjacent to one longitudinal side edge of its mutually respective flat face on said rotor body and the bottom edge of each blade is adajacent to the opposite longitudinal side edge of flat face on said rotor.

* * * * *